Figure 1:
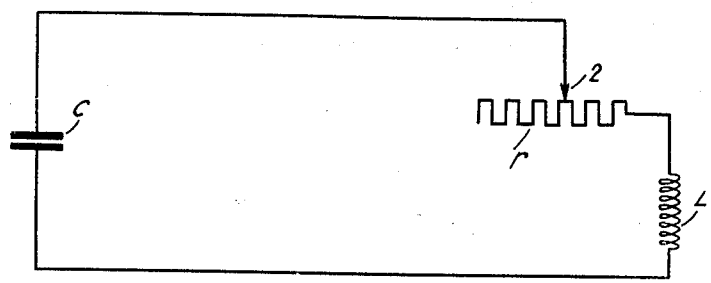

May 29, 1934.    C. BOL ET AL    1,960,893
ARRANGEMENT FOR REGULATING THE SELECTIVITY OF RECEIVING APPARATUS
Filed Sept. 10, 1930

INVENTORS
CORNELIS BOL AND
BY  HERRE RINIA
ATTORNEY

Patented May 29, 1934

1,960,893

UNITED STATES PATENT OFFICE 1,960,893

ARRANGEMENT FOR REGULATING THE SELECTIVITY OF RECEIVING APPARATUS

Cornelis Bol and Herre Rinia, Eindhoven, Netherlands, assignors to Radio Corporation of America, a corporation of Delaware Application September 10, 1930, Serial No. 480,938
In the Netherlands October 3, 1929

8 Claims. (Cl. 178—44)

This invention relates to an arrangement for regulating the selectivity of receiving apparatus.

The selectivity of radio receiving apparatus depends on the damping of the tuning circuits arranged therein. This damping partly depends on the ohmic resistance of the inductance coils inserted in the said circuits, whilst it is also partly determined by losses resulting from induction in neighbouring conductors and from dielectric losses occurring either in the material of the condenser or in that of the inductance coil. When applying air-condensers the dielectric losses occurring in the dielectric are so small that they may be neglected. The dielectric losses occurring in the dielectric material of the coils, however, cannot be reduced to zero. In spite of these losses in some instances the coil has such a small resistance that the selectivity of the circuit is too great for certain purposes. In this case according to the invention, a regulating resistance may be inserted in series with the coil, by means of which the amount of damping may be properly adjusted. This is of special importance in receiving apparatus constructed for a wide range of wave lengths. With these apparatus it often occurs that the selectivity in the case of long waves deviates considerably from that occurring in the case of receiving short waves.

When receiving a modulated carrier wave, for example a carrier wave modulated by speech vibrations, it is desired that an oscillation having a frequency lying at a certain distance apart from that of the carrier wave, is no longer received with a rather considerable strength, in other words the resonance curve should have a certain width. By the expression "width of the resonance curve" may be understood the width of the frequency band, which is determined by two limiting frequencies lying on either side of the resonance frequency, said limiting frequencies being received with a rather weak strength relatively to the resonance frequency at the same external electromotive force. The ratio between the strength of the resonance frequency and that of the limiting frequency may be established rather at will, thereby taking into account the requirements to which the reception should come up. A very common method applied for determining the width of the frequency curve consists in tracing those frequencies lying on either side of the resonance frequency, whose strength corresponds to half the strength of the resonance frequency at the same external electro-motive force.

Let it be assumed that the circuit comprises only a self induction, a resistance and a capacity, whose values are denoted by L, R, and C respectively, then the current intensity, provided resonance is established, will be E:R at an external electromotive force E, whilst at a frequency deviating an amount $\Delta W$ from the resonance frequency W the current intensity becomes equal to $$\frac{E}{\sqrt{R^2+4(\Delta W)^2 L^2}}.$$

Now the difference between the limiting frequency above referred to and the resonance frequency may be found by means of the equation:

$$\Delta W = \sqrt{3}\,\frac{R}{2L}$$

from which results that the circuit should have a resistance $$R = \frac{2}{\sqrt{3}}\Delta WL.$$

Since L has a fixed value so long as the same coil is used, and a definite selectivity is required in accordance with the nature of the received oscillations, it is advisable to render R adjustable.

In general $\Delta$ is independent of the wave length when receiving telephony. Since as a rule in the case of short waves a smaller self induction is applied than in the case of long waves, the value of R at short waves should be different from that at long waves. According to the invention this possibility is attained by connecting a regulation resistance in series in one or more circuits. In this case the resistance may be chosen in accordance with the value of the self induction, it being moreover also possible to adjust the selectivity at will.

In the above considerations it has been supposed that the resistance of the oscillatory circuit is independent of the frequency. In practice it is found, however, that this is not quite true, since there may offer cases in which the resistance depends rather strongly on the frequency. This is probably due to the fact, that the dielectric losses occurring in the dielectric of the coils depend on the frequency. These losses can be accounted for by a series resistance consisting of a constant term and a term which is proportional to the frequency. The higher the frequency the greater this series-resistance will be. This results in that also the reading of the condenser acts upon the width of the resonance curves, in such a sense that the width of the resonance curve increases as the capacity becomes smaller. This results in that the selectivity in the case of a small capacity being applied is less than in the case of a great capacity. According to the invention this drawback may be obviated by connecting a condenser in parallel to the series resistance.

The series resistance may be of the order of magnitude of 100 ohms whilst capacity connected in parallel thereto may have a value of approximately 2000 centimetres.

The invention will be more clearly understood by reference to the acompanying drawing representing by way of example some embodiments of tuned circuits.

Figure 1 shows a tuned circuit comprising a self induction L and a capacity C. In addition a resistance $r$ which may be regulated by means of a slide contact 2 is inserted in the circuit. The resistance R appearing in the formulæ above referred to is constituted by the resistance $r$ the resistance of the inductance coil and the resistance accounting for the losses occurring in the dielectric and those caused by induction in neighbouring conductors etc.

Figure 2:
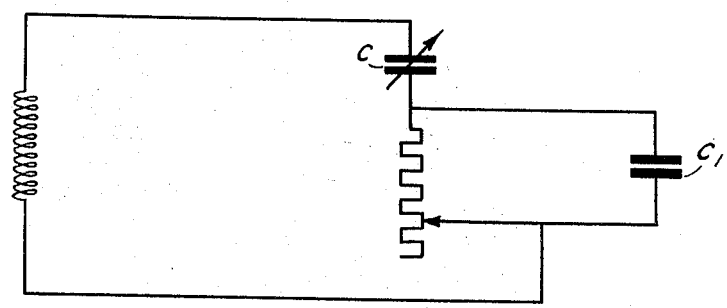

In Figure 2 a similar circuit is shown as in Figure 1, but here a condenser $C_1$ is coupled in parallel to the part $r$ of the regulating resistance connected in the circuit.

What we claim is:

1. A tuned circuit for frequency selection comprising an inductive reactor and a capacitive reactor connected in parallel, one of said reactors being variable for tuning said circuit and means connected in series with one of said reactors for regulating the selectivity of said circuit, said means consisting of a variable resistor and a capacitor connected in parallel with said resistor.

2. A tuned circuit for frequency selection comprising a pair of tuning reactance elements connected in said circuit, a variable resistance connected in said circuit and a condenser connected in parallel with at least a portion of said resistance.

3. A parallel tuned circuit including an inductive reactance element and a capacitive reactance element and means connected in said circuit for controlling its selectivity, said means consisting of a pair of impedance elements connected in parallel, one of said impedance elements constituting a resistance.

4. A tuned circuit for frequency selection comprising inductive and capacitive reactance elements and means connected in said circuit for controlling its selectivity, said means consisting of a pair of impedance elements connected in parallel, one of said impedance elements comprising a resistance and the other comprising a reactance element.

5. A tuned circuit as claimed in claim 4 in which said reactance element is a capacitive reactance element.

6. A tuning circuit for radio apparatus comprising a pair of reactors connected in parallel with respect to the input, one of said reactors being variable to vary the tuning of the circuit and means connected in series with said reactors having an effective resistance which increases as the frequency to which the circuit is tuned decreases.

7. A tuning circuit for tuning radio apparatus over a band of frequencies comprising inductive and capacitive reactance elements connected in parallel with respect to the source of energy, one of said reactance elements being variable for tuning said circuit over said band of frequencies and means connected in series with said reactance elements having an effective resistance which varies as the circuit is tuned over the band of frequencies in the opposite manner to the variation of the effective resistance of said inductive reactance element.

8. The method of maintaining the effective resistance of a tuning circuit including an inductor and capacitor substantially constant over a band of frequencies which consists of including a resistor in series with said inductor and capacitor and by-passing an increasing amount of the current in said circuit around said resistor as the frequency to which said circuit is tuned is increased.

CORNELIS BOL.
HERRE RINIA.